US010501014B2

United States Patent
Castro et al.

(10) Patent No.: US 10,501,014 B2
(45) Date of Patent: Dec. 10, 2019

(54) REMOTE ASSIST FEEDBACK SYSTEM FOR AUTONOMOUS VEHICLES

(71) Applicant: UATC, LLC, San Francisco, CA (US)

(72) Inventors: Alex Castro, Pittsburgh, PA (US); Molly Nix, Pittsburgh, PA (US); Scott Poeppel, Pittsburgh, PA (US); Sean Chin, Pittsburgh, PA (US); Eric Hanson, Pittsburgh, PA (US); Dennis Zhao, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 0 days.

(21) Appl. No.: 15/918,043

(22) Filed: Mar. 12, 2018

(65) Prior Publication Data

US 2019/0270408 A1 Sep. 5, 2019

Related U.S. Application Data

(60) Provisional application No. 62/637,563, filed on Mar. 2, 2018.

(51) Int. Cl.
*B60Q 9/00* (2006.01)
*G07C 5/08* (2006.01)
*G07C 5/00* (2006.01)
*H04W 4/44* (2018.01)

(52) U.S. Cl.
CPC .............. *B60Q 9/00* (2013.01); *G07C 5/008* (2013.01); *G07C 5/0808* (2013.01); *H04W 4/44* (2018.02)

(58) Field of Classification Search
CPC ........ B60Q 9/00; G07C 5/008; G07C 5/0808; H04W 4/44; B60W 30/0953
USPC .......................................................... 340/438
See application file for complete search history.

(56) References Cited

U.S. PATENT DOCUMENTS

| | | | |
|---|---|---|---|
| 8,527,199 B1* | 9/2013 | Burnette | G01C 21/32 701/23 |
| 2007/0100962 A1* | 5/2007 | Barth | G06F 16/9535 709/217 |
| 2009/0088916 A1* | 4/2009 | Elgersma | G05D 1/101 701/23 |
| 2010/0312464 A1* | 12/2010 | Fitzgerald | G01C 21/343 701/532 |
| 2016/0334797 A1* | 11/2016 | Ross | G01C 21/3492 |
| 2017/0203766 A1* | 7/2017 | Prokhorov | B60W 40/09 |
| 2017/0282821 A1* | 10/2017 | Zych | B60R 16/037 |
| 2017/0363437 A1* | 12/2017 | Baracco | G01C 21/367 |
| 2018/0182380 A1* | 6/2018 | Fritz | G10L 15/1815 |
| 2018/0202822 A1* | 7/2018 | DeLizio | G01C 21/3407 |
| 2018/0229723 A1* | 8/2018 | Jiang | B60W 30/0953 |
| 2018/0278740 A1* | 9/2018 | Choi | H04M 1/72522 |
| 2019/0108692 A1* | 4/2019 | Du | G07C 5/0808 |

* cited by examiner

*Primary Examiner* — Jack K Wang
(74) *Attorney, Agent, or Firm* — Dority & Manning, P.A.

(57) ABSTRACT

An interaction feedback system for passengers of an autonomous vehicle (AV) can detect a remote assist trigger, corresponding to a remote assist event, from a control system of the AV. The feedback system can then initiate a feedback mode using one or more feedback devices to enable interaction between one or more passengers of the AV and a remote operator based on detecting the remote assist trigger from the AV control system.

20 Claims, 6 Drawing Sheets

REMOTE ASSIST FEEDBACK SYSTEM FOR AUTONOMOUS VEHICLES

CROSS REFERENCE TO RELATED APPLICATION

This application claims the benefit of priority to U.S. Provisional Application No. 62/637,563, titled REMOTE ASSIST FEEDBACK SYSTEM FOR AUTONOMOUS VEHICLES, and filed on Mar. 2, 2018; the aforementioned application being hereby incorporated by reference in its entirety.

BACKGROUND

The advancement of autonomous vehicle (AV) technology involves the safe transition from current programs requiring occasional on-board human intervention and awareness or full autonomy in test environments to enabling safe, fully-autonomous systems with capabilities equal to or greater than human drivers in virtually all driving scenarios. This transition towards "Level 4" and "Level 5" autonomy entails the goal of removing human involvement entirely in the operation of the AV in typical and unexpected traffic scenarios on public roads and highways.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

An autonomous vehicle (AV) can include a sensor suite to generate a live sensor view of a surrounding area of the AV and acceleration, braking, and steering systems autonomously operated by a control system. In various implementations, the control system can dynamically analyze the sensor view of the surrounding area and a road network map, or a highly detailed localization map, in order to autonomously operate the acceleration, braking, and steering systems along a current route to a destination.

The control system can further execute an instruction set that causes that control system to dynamically analyze the sensor view to operate the acceleration, braking, and steering systems along a current route. In analyzing the sensor data, the control system can determine a teleassist state or situation requiring remote human assistance. The AV can further include a passenger feedback system, which can include a control interface connected to the control system of the AV, and one or more feedback devices to generate remote assist feedback for one or more passengers of the AV. The feedback devices can be operated by a feedback controller, which can detect a remote assist trigger, corresponding to a remote assist event, from the control system of the AV. The feedback controller can further initiate a feedback mode using the feedback devices to enable interaction between the passengers of the AV and a remote operator.

In various examples, the feedback system can further include a communication interface enabling two-way interaction between the one or more passengers of the AV and the remote operator. In certain implementations, the feedback controller can enable the two-way communications by establishing a connection with a service application executing on the computing devices of the passengers of the AV to enable the two-way interaction between the one or more passengers and the remote operator. Additionally or alternatively, the communication interface of the feedback system can comprise an on-board display screen displaying a user interface enabling the one or more passengers to communicate with the remote operator. In further implementations, the communication interface can include a voice input device (e.g., a microphone) enabling the passengers to provide voice input to the remote operator (e.g., converse with a human operator). As described herein, the remote operator can be a human operator or a computer-based, virtual operator (e.g., implementing artificial intelligence software).

In certain aspects, the feedback devices can comprise a plurality of output devices. For example, the AV can include a set of speakers, on-board display screens or touch screens, analog or digital buttons, haptic feedback mechanisms, interior lighting (e.g., mood lighting), interior cameras, and the like. Such output devices can be utilized by the feedback system to provide interactive feedback in response to the AV initiating a remote assist state. In various examples, the feedback system can also include a remote assist input feature (e.g., a button or displayed icon) that the user can select in order to initiate remote assistance or inquiries.

As provided herein, the remote assist event can correspond to a perception fault, a connectivity fault, a mechanical fault, a motion planning fault, a routing fault, etc. For example, perception faults can correspond to sensor view occlusions, indeterminate objects, lens debris, and the like. A connectivity fault can comprise a communication fault or failure between the AV and a remote transport management system that coordinates tasks to be performed by the AV, such as pick-ups and drop-offs of passengers. A mechanical fault can correspond to any hardware or component failure or fault on the vehicle, such as a battery failure, oil leak, control system faults (e.g., acceleration, steering, and/or braking faults), alignment issues, drive train faults, power train issues, suspension issues, and the like. A motion planning fault can correspond to, for example, a stale localization map, or a route going beyond a mapped autonomy grid in which the AV operates. A routing fault can comprise a route blockage (e.g., a traffic accident or construction zone), or can result from unexpectedly heavy traffic. It is contemplated that various additional events may trigger remote assist by the AV. It is further contemplated that a passenger can initiate remote assist (e.g., by selecting a remote assist feature on an on-board user interface).

In various implementations, the feedback system can operate in multiple modes, including a normal operational mode when the AV is functioning nominally. In the normal mode, the feedback devices can output routing or motion planning information concerning route progress to a destination. The multiple modes can further include an interaction feedback mode when the AV is in a remote assist or teleassistance state. In certain example, the interaction feedback mode can enable one-way or two-way communications between the AV and a remote operator. In variations, the interaction feedback mode can cause the feedback system to output update information concerning any progress or updates made regarding assistance state of the AV. For example, when the AV connects with a teleassistance operator and transmits an inquiry or contextual data indicating the assistance event (e.g., image or LIDAR data), the feedback system and output information indicating that the AV is speaking with teleassistance to attempt to resolve the assistance state. As another example, when a resolution response has been received from a remote teleassistance operator, the feedback system can output information indicating that the assistance state is being resolved. Furthermore, as described herein, the interaction feedback mode can enable the user to interact with a remote operator.

In certain examples, the multiple modes can also include a transitional mode that transitions between the normal mode and the interaction feedback mode. For example, prior to enabling communication between the passenger(s) and the remote operator, the transitional mode can provide the one or more passengers an alert, using the feedback devices, indicating that the AV has experienced the remote assist event. The transitional mode can comprise a combination of alert sounds, lighting (e.g., interior mood lighting), and display transitions (e.g., from displaying motion planning information to attention alert content). If the assistance state has been resolved, then the feedback system can again enter the transitional mode indicating the transition from the interaction feedback mode to the normal operating mode.

Among other benefits, the examples described herein achieve a technical effect of providing real-time updates regarding the state of the AV to the passengers and enabling communications between the passengers and remote operators. This technical effect is envisioned to provide reassurance and interactivity for AV passengers, which can result in a more constructive transition from human-driven vehicles to AV transport, and promote increased ubiquity of AV usage.

As used herein, a computing device refers to devices corresponding to desktop computers, computer servers, mobile computing devices or smartphones, laptop computers, tablet computing devices, virtual reality (VR) and/or augmented reality (AR) devices, wearable computing devices, etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, mobile devices or smartphones, tablet computers, laptop computers, virtual reality (VR) or augmented reality (AR) computers, and/or network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and non-transitory computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

As provided herein, the term "autonomous vehicle" (AV) describes any vehicle operating in a state of autonomous control with respect to acceleration, steering, braking, auxiliary controls (e.g., lights and directional signaling), and the like. Different levels of autonomy may exist with respect to AVs. For example, some vehicles may enable autonomous control in limited scenarios, such as within mapped autonomy grids or on highways. More advanced AVs, such as those described herein, can operate in a variety of traffic environments without any human assistance. Accordingly, an "AV control system" can process sensor data from the AV's sensor array, and modulate acceleration, steering, and braking inputs to safely drive the AV along a given route.

System Description

Figure 1:
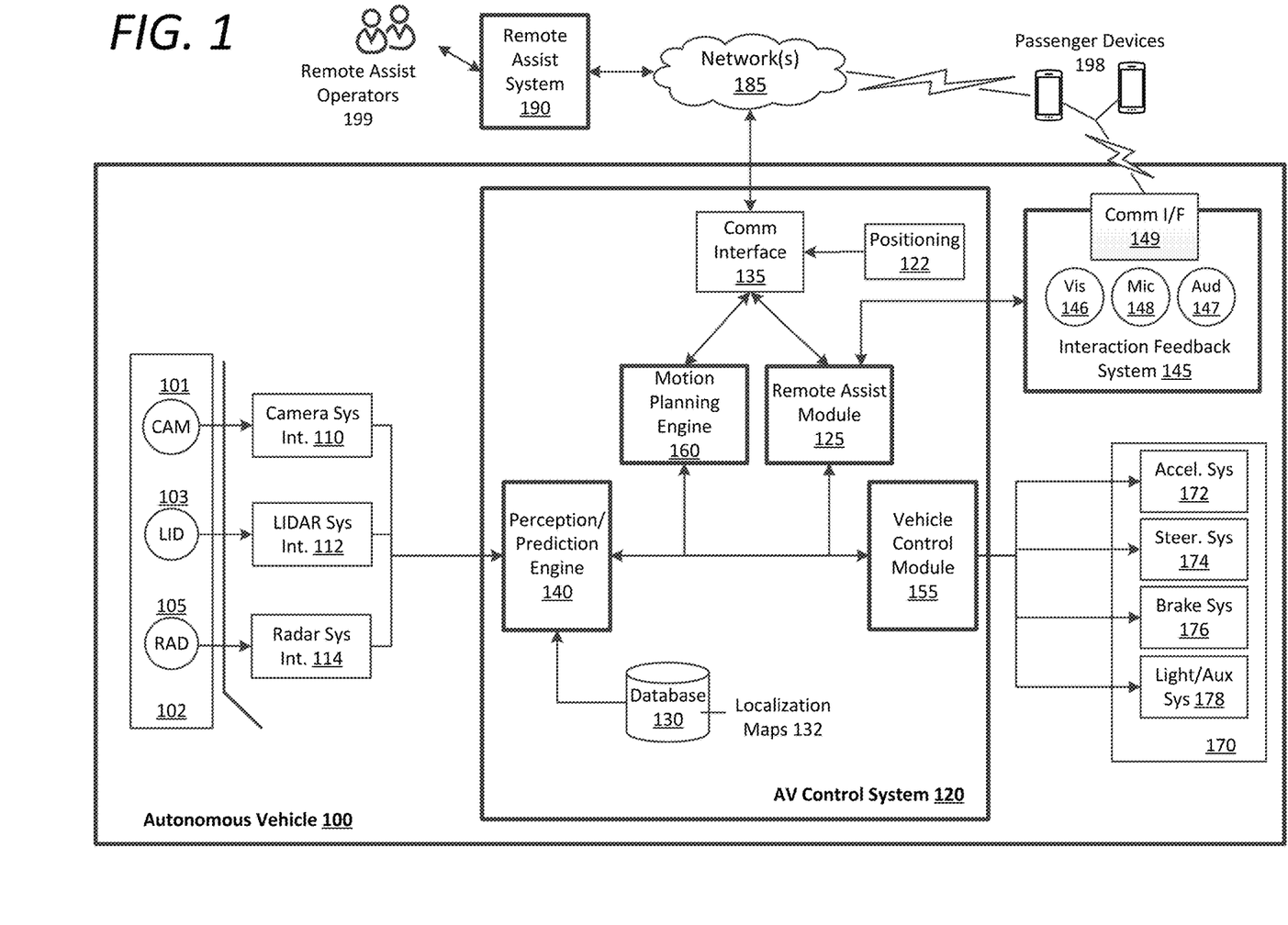
FIG. 1 is a block diagram illustrating an example AV operated by a control system implementing a remote assist module, according to examples described herein.

FIG. 1 is a block diagram illustrating an example AV 100 operated by a control system 120 implementing a remote assist module 125, as described herein. In an example of FIG. 1, a control system 120 can autonomously operate the AV 100 in a given geographic region, and can perform transport services (e.g., transport of humans, delivery services, etc.). In examples described, the AV 100 can operate without human control. For example, the AV 100 can autonomously steer, accelerate, shift, brake, and operate lighting components without human intervention. In certain variations, the AV 100 can switch between an autonomous mode, in which the AV control system 120 autonomously operates the AV 100, and a manual mode in which a driver takes over manual control of the acceleration system 172, steering system 174, braking system 176, and lighting and auxiliary systems 178 (e.g., directional signals and headlights).

According to some examples, the control system 120 can utilize specific sensor resources in order to autonomously operate the AV 100 in a variety of driving environments and conditions. For example, the control system 120 can operate the AV 100 by autonomously operating the steering, acceleration, and braking systems 172, 174, 176 of the AV 100 to a specified destination. The control system 120 can perform vehicle control actions (e.g., braking, steering, accelerating) and route planning using sensor information, as well as other inputs (e.g., transmissions from remote or local human operators, network communication from other vehicles, etc.).

In an example of FIG. 1, the control system 120 includes computational resources (e.g., processing cores and/or field programmable gate arrays (FPGAs)) which operate to process sensor data received from a sensor system 102 of the AV 100 that provides a sensor view of a road segment upon which the AV 100 operates. The sensor data can be processed to determine actions which are to be performed by the AV 100 in order for the AV 100 to continue along a current route to the destination. In some variations, the control system 120 can include other functionality, such as wireless communication capabilities using a communication interface 135, to send and/or receive wireless communications over one or more networks 185 with one or more remote sources. In controlling the AV 100, the control system 120 can generate commands to control the various control mechanisms 170 of the AV 100, including the vehicle's acceleration system 172, steering system 174, braking system 176, and auxiliary systems 178 (e.g., lights and directional signals).

The AV 100 can be equipped with multiple types of sensors 102 which can combine to provide a computerized perception, or sensor view, of the space and the physical environment surrounding the AV 100. Likewise, the control system 120 can operate within the AV 100 to receive sensor data from the sensor suite 102 and to control the various control mechanisms 170 in order to autonomously operate the AV 100. For example, the control system 120 can analyze the sensor data 115 to generate low level commands executable by the acceleration system 172, steering system 174, and braking system 176 of the AV 100. Execution of the commands by the control mechanisms 170 can result in throttle inputs, braking inputs, and steering inputs that collectively cause the AV 100 to operate along sequential road segments to a particular destination.

In more detail, the sensor suite 102 operates to collectively obtain a sensor view for the AV 100 (e.g., in a forward operational direction, or providing a 360 degree sensor view), and to further obtain situational information proximate to the AV 100, including any potential hazards or obstacles. By way of example, the sensors 102 can include multiple sets of camera systems 101 (video cameras, stereoscopic cameras or depth perception cameras, long range monocular cameras), LIDAR systems 103, one or more radar systems 105, and various other sensor resources such as sonar, proximity sensors, infrared sensors, and the like. According to examples provided herein, the sensors 102 can be arranged or grouped in a sensor system or array (e.g., in a sensor pod mounted to the roof of the AV 100) comprising any number of LIDAR, radar, monocular camera, stereoscopic camera, sonar, infrared, or other active or passive sensor systems.

Each of the sensors 102 can communicate with the control system 120 utilizing a corresponding sensor interface 110, 112, 114. Each of the sensor interfaces 110, 112, 114 can include, for example, hardware and/or other logical components which are coupled or otherwise provided with the respective sensor. For example, the sensors 102 can include a video camera and/or stereoscopic camera system 101 which continually generates image data of the physical environment of the AV 100. The camera system 101 can provide the image data for the control system 120 via a camera system interface 110. Likewise, the LIDAR system 103 can provide LIDAR data to the control system 120 via a LIDAR system interface 112. Furthermore, as provided herein, radar data from the radar system 105 of the AV 100 can be provided to the control system 120 via a radar system interface 114. In some examples, the sensor interfaces 110, 112, 114 can include dedicated processing resources, such as provided with field programmable gate arrays (FPGAs) which can, for example, receive and/or preprocess raw image data from the camera sensor.

In general, the sensor systems 102 collectively provide sensor data to a perception/prediction engine 140 of the control system 120. In various implementations, the perception/prediction engine 140 can access a database 130 comprising stored localization maps 132 of the given region in which the AV 100 operates. The localization maps 132 can comprise highly detailed ground truth data of each road segment of the given region. For example, the localization maps 132 can comprise prerecorded data (e.g., sensor data including image data, LIDAR data, and the like) by specialized mapping vehicles or other AVs with recording sensors and equipment, and can be processed to pinpoint various objects of interest (e.g., traffic signals, road signs, and other static objects). As the AV 100 travels along a given route, the perception/prediction engine 140 can access a current localization map of a current road segment to compare the details of the current localization map with the sensor data in order to detect and classify any objects of interest, such as moving vehicles, pedestrians, bicyclists, and the like.

In various examples, the perception/prediction engine 140 can dynamically compare the live sensor data from the AV's sensor systems 102 to the current localization map as the AV 100 travels through a corresponding road segment. The perception/prediction engine 140 can flag or otherwise identify any objects of interest in the live sensor data that can indicate a potential hazard. In accordance with many examples, the perception/prediction engine 140 can output a processed sensor view indicating such objects of interest to a vehicle control module 155 of the AV 100. In further examples, the perception/prediction engine 140 can predict a path of each object of interest and determine whether the AV control system 120 should respond or react accordingly. For example, the perception/prediction engine 140 can dynamically calculate a collision probability for each object of interest, and generate event alerts if the collision probability exceeds a certain threshold. As described herein, such event alerts can be processed by the vehicle control module 155 that generates control commands executable by the various control mechanisms 170 of the AV 100, such as the AV's acceleration, steering, and braking systems 172, 174, 176.

On a higher level, the AV control system 120 can include a motion planning engine 160 that provides the vehicle control module 155 with a motion plan and a travel trajectory along a current route to a destination. The current route may be determined by a backend transport system, or may be determined by the AV 100 via access to a local or external mapping service. In some aspects, the AV 100 can include a user interface, such as a touch-screen panel or speech recognition features, which can enable a passenger to input a destination. In some aspects, the AV 100 may communicate with an on-demand transport management system that manages routing of any number of AVs operating throughout a given region to provide transportation services to requesting riders. Thus, the motion planning engine 160 may receive the destination from the on-demand transport system over the network(s) 185 in order to plan a current route for the AV 100.

In mapping the current route, the motion planning engine 160 can generally utilize an on-board mapping engine or an external mapping service by transmitting map calls over the network(s) 185 in order to determine a most optimal route plan from a current location of the AV 100 to the destination. This route plan may be determined based on distance, time, traffic conditions, additional pick-ups (e.g., for carpooling services), and the like. For each successive road segment on which the AV 100 travels, the motion planning engine 160 can provide trajectory data to the vehicle control module 155 to enable the vehicle control module 155 to operate the AV 100 safely to the next road segment or the destination. For example, the trajectory data can indicate that the vehicle control module 155 must change lanes or make a turn within the current localization map in order to proceed to the next road segment along the current route plan.

According to examples provided herein, the vehicle control module 155 can utilize the motion plan, the processed sensor view, and event alerts to autonomously operate the control mechanisms 170 of the AV 100. As an example, to make a simple turn based on the route plan, the vehicle control module 155 can generate control commands that cause the lights and auxiliary systems 178 of the AV 100 to activate the appropriate directional signal, the braking system 176 to slow the AV 100 down for the turn, the steering system 174 to steer the AV 100 into the turn, and the acceleration system 172 to propel the AV 100 when exiting the turn. In further examples, event alerts may indicate potential hazards such as a pedestrian crossing the road, a nearby bicyclist, obstacles on the road, a construction area, proximate vehicles, an upcoming traffic signal and signal state, and the like. The vehicle control module 155 can respond to each event alert on a lower level while, on a higher level, operating the AV 100 based on the motion plan determined by the motion planning engine 160.

According to examples described herein, the control system 120 can include a remote assist module 125 to enable remote assistance operators 199 to aid the AV 100 in progressing along a route when a teleassistance state or scenario is detected, or when the AV control system 120 encounters a stuck situation. The teleassistance state can comprise a detection anomaly in which the control system 120 has difficulty detecting objects (e.g., due to an occlusion), an identification or classification anomaly in which the perception/prediction engine 140 has difficulty classifying detected objects, a scenario in which the AV control system 120 is unable to make a safe decision (e.g., a crowded pedestrian area), or a fault condition corresponding to a diagnostics fault, disconnection, or failure of a component of the AV 100, such as a computer, a mechanical component, or a sensor. In normal operation, a teleassistance state can cause the AV 100 to slow down, pull over, or stop while the AV control system 120 attempts to resolve the teleassistance state.

In various implementations, when a teleassistance state exists, the perception/prediction engine 140 can submit a teleassistance request to the remote assist module 125. The remote assist module 125 can treat the request based on the type of teleassistance state to, for example, compile sensor data, prioritize certain types of sensor data, encode the sensor data at different rates or qualities, specify an anomalous object in the sensor data (e.g., using a bounding box), and/or incorporating telemetry, diagnostic data, and/or localization data (e.g., position and orientation of the AV 100) with the inquiry.

In various examples, the AV control system 120 can further include a location-based resource, such as a positioning module 122 to provide location data to the remote assistance system 190. In various examples, the teleassistance request and the location data can cause the teleassistance system 190 to generate an operator user interface feature that enables a remote assistance operator 199 to analyze a set of decision options and make a subjective selection of a most optimal decision option. As described in further detail herein, the operator user interface can enable the remote assistance operator 199 to view relevant sensor data, location data and telemetry data in the teleassistance data package to analyze the teleassistance state of the AV 100.

In selecting a teleassistance operator 190, the teleassistance system 190 can determine a first available operator 199 and provide the operator user interface to that operator 199. In certain implementations, the operator user interface can enable the teleassistance operator 199 to toggle through individual video streams, via the teleassistance data package, from individual cameras or groups of cameras on the AV's 100 sensor suite 102 in order to provide more context to the teleassistance state. In addition, the operator user interface can provide a live connection to the AV control system 120 of the AV 100 to enable the teleassistance operator 199 to receive contextual information concerning the teleassistance state, and make a quick decision regarding the set of decision options.

Once the teleassistance operator 199 has selected a decision option on the operator user interface, the remote assist system 190 can generate a teleassistance command corresponding to the selected decision option, and provide the teleassistance command to the AV 100. For example, the teleassistance system 190 can transmit the teleassistance command to the communication interface 135 of the AV 100. As described herein, the teleassistance command can comprise a response message including an instruction to perform the selected decision by the remote assistance operator 199. Thus, examples provided herein leverage the (current) advantages of human cognition to make the final decision. Such a system can provide vast amounts of decision data that can be used to train AV control systems (e.g., through software updates or deep learning techniques) of all AVs operating throughout a given region.

The remote assist module 125 can process the teleassistance command and generate a response to the source of the teleassistance state, depending on the cause of the teleassistance state. For example, if the perception/prediction engine 140 is unable to classify a detected object, the response message including the teleassistance command can correspond to the classification of the indeterminate object. Thus, the remote assist module 125 can provide the object classification of the indeterminate object to the perception/prediction engine 140, which can complete the processed sensor view (e.g., with the newly classified object) for the vehicle control module 155—or otherwise provide an event alert if the classified object comprises a hazard.

In variations, the teleassistance command can comprise a maneuver command (e.g., maneuvering around a construction zone with caution), an ignore command, a wait command (e.g., in traffic accident scenarios), a command to proceed slowly with high caution, or an alternative route. Such commands can collectively comprise trajectory updates, which can be provided to the vehicle control module 155 for execution. Such trajectory updates can correspond directly to the selected decision option by the human teleassistance operator 199. Accordingly, the vehicle control module 155 can execute the trajectory update by generating control commands executable to modulate braking, steering, and acceleration inputs, and selectively initiating the lights and auxiliary systems 178 (e.g., signaling intent to other vehicles).

According to examples described herein, the AV 100 can further include a passenger interaction feedback system 145 that can provide passengers of the AV 100 updated data concerning the current state of the AV 100. In various examples, the passenger feedback system 145 can operate in multiple modes that can correspond to the state of the AV 100. For example, in a normal operational mode, the feedback system 145 can display map data indicating a current route being traveled by the AV 100, and/or display aspects of the live sensor view generated by the sensor system 102 (e.g., a live 3-D point cloud map generated by the LIDAR system 103).

In certain implementations, the feedback system 145 can include a set of feedback devices corresponding to input and output devices. For example, the feedback devices can include a visual feedback mechanism 146 (e.g., one or more touch screens), a voice input mechanism 148 (e.g., a microphone), and/or an audio feedback mechanism 147. In some aspects, the feedback devices can comprise a computing device, such as a tablet computer mounted within the passenger interior of the AV 100.

In certain examples, the feedback system 145 can enable the passengers to communicate with a remote assistance operator 199, which can be the same or a different operator than an operator assisting the AV 100. In certain aspects, the passenger can initiate communications with the remote operator 199 by selecting a remote assist feature of the feedback system 145 (e.g., a displayed assist icon or a physical button). For example, the passenger can interact with the remote operator 199 for inquiries regarding a teleassist state of the AV 100.

According to various implementations, the feedback system 145 can detect, from the remote assist module 125, when the AV control system 120 enters a teleassistance state. Based on the teleassistance state, the feedback system 145 can initiate a transition mode in which the feedback system 145 alerts the passenger(s) within the AV 100. In this transition mode, the feedback system 145 can output dedicated audio (e.g., a chime sound) change the lighting within the vehicle (e.g., set mood lighting with a dedicated color), and/or display an alert stating that the AV 100 has entered a teleassistance state. Furthermore, in the transition mode, the feedback system 145 can further attempt to determine the cause of the teleassist state by communicating with the remote assist module 125 of the AV control system 120. Once the cause is determined, the feedback system 145 can complete the transition from the normal operational mode to an interaction feedback mode.

In the interaction feedback mode, the feedback system 145 can provide contextual information to the passenger regarding the teleassistance state. For example, the feedback system 145 can display content and/or output audio describing the reason for the teleassist state and that the AV 100 is in the process of resolving it. In some aspects, the feedback system 145 can further provide the passenger with step by step content corresponding to any updates to the process of resolving the teleassist state. For example, the feedback system 145 can display information indicating that the remote assist module 125 is connecting with a remote assist system 190, that a solution is being determined, that a solution his being received, and/or that the teleassist state is being resolved. Once the state has been resolved, the feedback system 145 can enter a second transition mode to transition from the interaction feedback mode back to the normal operational mode.

It is contemplated that in certain scenarios, the teleassist state may not be resolved through remote communications between the remote assist system 190 and the remote assist module 125. In such scenarios, a secondary vehicle may be coordinated to pick-up the passenger at the AV's current location to complete the trip to the passenger's destination, and/or an on-site recovery service can be sent to recover the AV 100 or manually resolve the teleassist state. For example, an on-demand transport service can coordinate a nearby AV or human driver to pick-up the passenger to fulfill the trip to minimize inconvenience to the passenger.

In the interaction feedback mode, the feedback system 145 can further enable two-way communications between the passenger and the remote assist system 190. In doing so, the passenger can speak directly with a remote operator 199 over the network 185 using the microphone 148. In variations, the feedback system 145 can include a communication interface 149 that can connect with the computing device 198 of the passenger enable the two-way communications. In still further variations, the remote assist system 190 can connect directly with the computing device 198 of the passenger (e.g., via an executing application on the passenger device 198). It is further contemplated that the interaction feedback mode described herein can extend to the passenger device 198 via the executing application. Thus, the alerts and teleassist resolution updates can be displayed and/or outputted to the passenger via the executing application on the passenger device 198.

Remote Assistance

Figure 2:
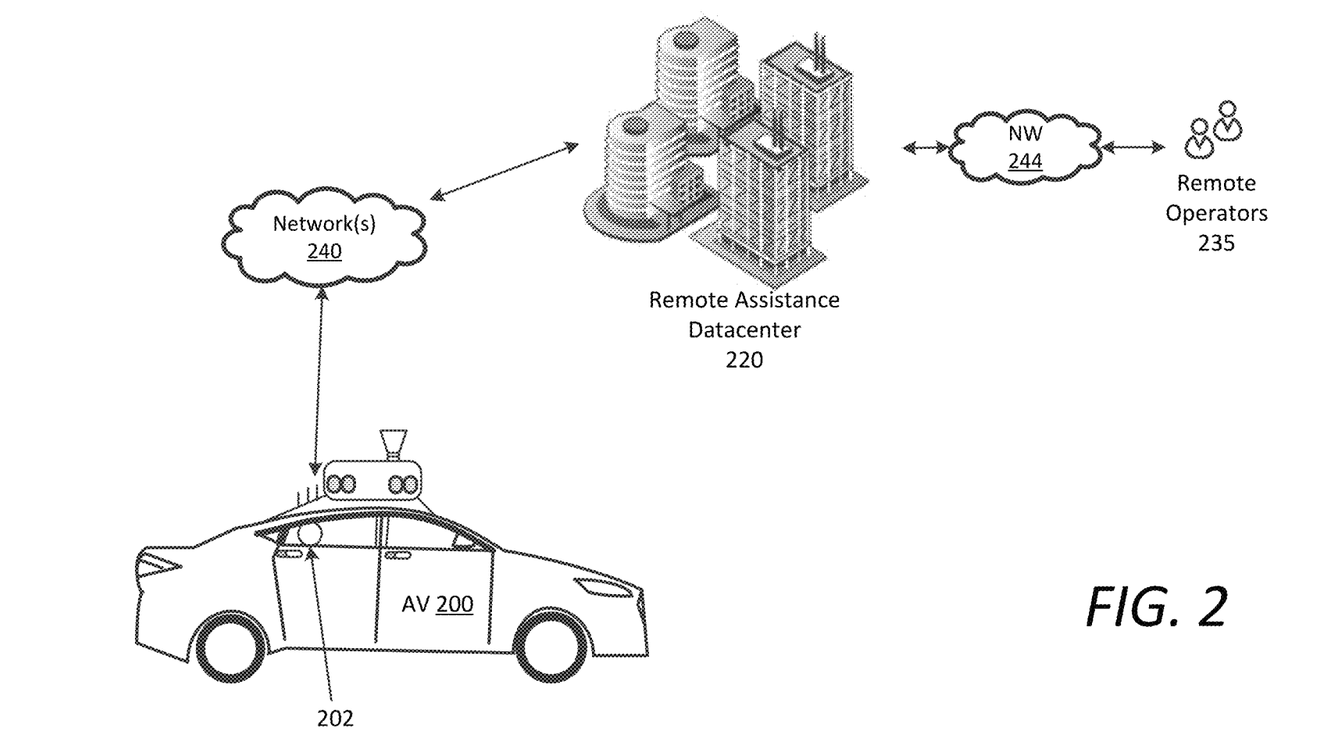
FIG. 2 shows an example autonomous vehicle initiating teleassistance, in accordance with example implementations.

FIG. 2 shows an example autonomous vehicle initiating teleassistance, in accordance with example implementations. In the example shown in FIG. 2, an AV 200 approaches a location or scenario that causes a teleassist state on the AV 200. In general, the teleassist state can cause the AV 200 to slow down or stop due to safety, disconnection, uncertainty (e.g., below a threshold), a set of criteria not being met to proceed (e.g., collision probability being exceeded, object uncertainty, or an anomalous situation, such as a road construction zone or pedestrians on the road, as shown), and the like. Based on the teleassistance state, the AV 200 can communicate a teleassistance request over one or more networks 240 with a remote assist datacenter 220 implementing a teleassistance system described herein.

In some aspects, the remote assist datacenter 220 can generate a decision option user interface and connect with a teleassistance operator over a local or non-local network 244. The remote assist datacenter 220 can provide a set of decision options on a generated user interface to an available human teleassistance operator 235. As described herein, the operator 235 can review the decision option user interface and subjectively select what the operator 235 believes to be the most optimal option on the user interface. Data indicating the selected decision may be transmitted back to the remote assist datacenter 220, enabling the remote assist datacenter 220 to generate a teleassistance command corresponding to the selected decision. The remote assist datacenter 220 may then transmit the teleassistance command back to the AV 200 over the network(s) 240. the AV 200 may then execute the teleassistance command to overcome or resolve the teleassistance state.

Additionally, the AV 200 can be transporting any number of passengers 202. The passenger 202 can interact with an on-board feedback system 145 within the AV 200 and/or the passenger's computing device (e.g., via a remote assist feature included in the executing application) to view or listen to content indicating the teleassistance event. The content can be generated by the vehicle's on-board feedback system 145 or can be transmitted from the remote assist datacenter 220 directly to the service application executing on the passenger's computing device.

In various examples, the teleassistance state can trigger two-way communications between the passenger 202 and a remote operator 235. The remote operator 235 can receive contextual data concerning the teleassistance state from the remote assist datacenter 220 or directly from the AV 200. In some aspects, the remote operator 235 can be a human operator to which the passenger 202 can speak directly. In variations, the remote operator 235 can be a computer-based operator (e.g., implementing artificial intelligence). As described herein, the operator 235 assisting the AV 200 can be the same as the operator 235 assisting the passenger 202, or they may be different.

Methodology

Figure 3:
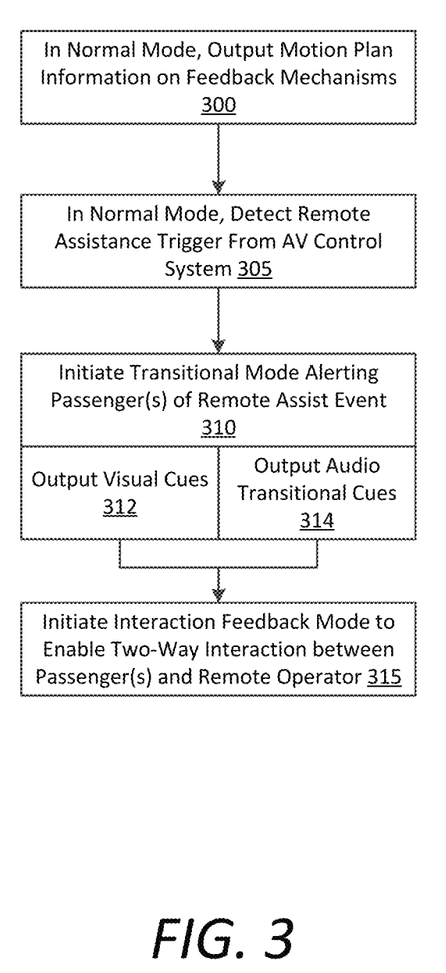
FIGS. 3 and 4 are flow charts describing example methods of providing interactive feedback to passengers of an autonomous vehicle, according to examples described herein.
Figure 4:
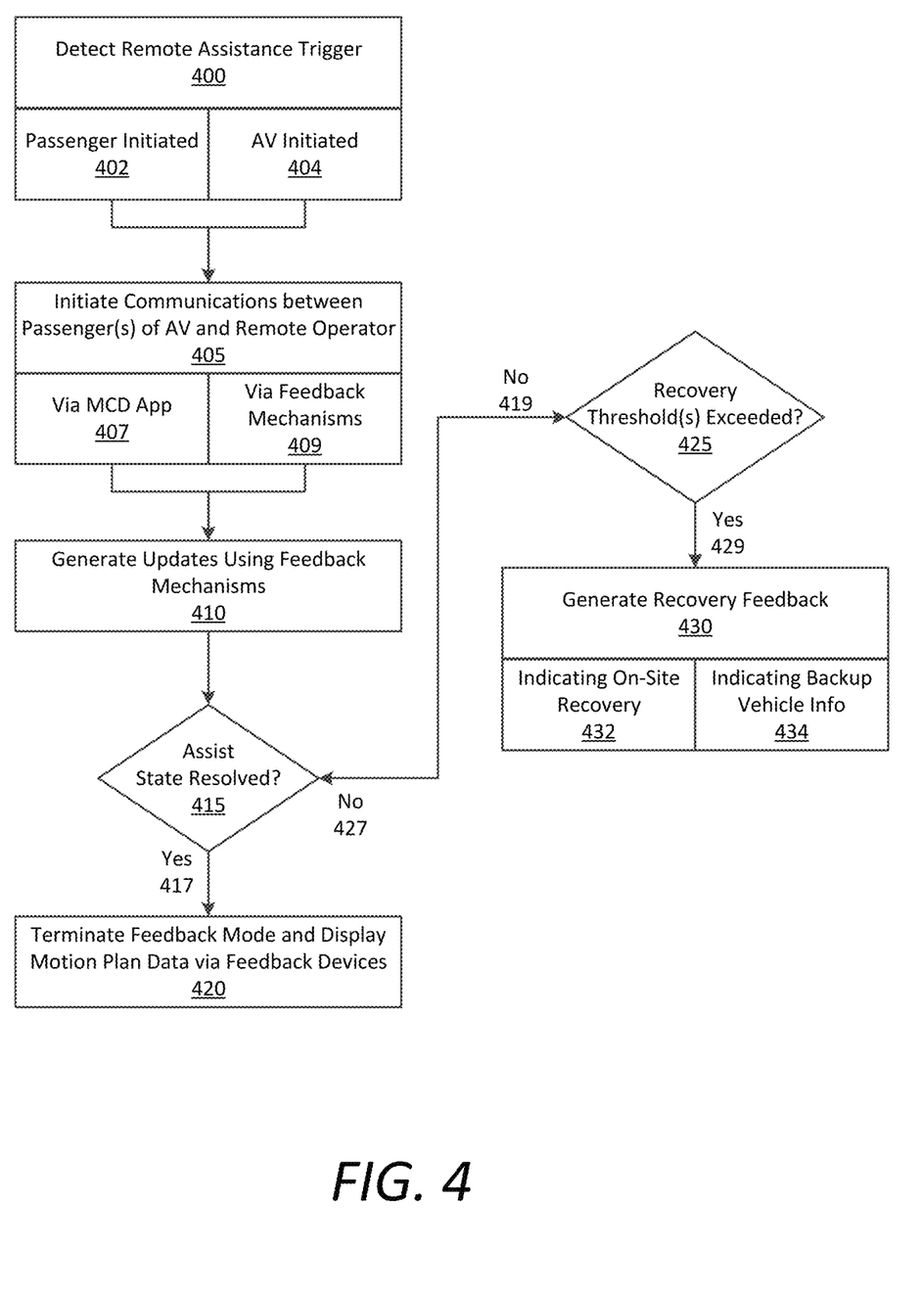

FIGS. 3 and 4 are flow charts describing example methods of providing interactive feedback to passengers of an autonomous vehicle, according to examples described herein. In the below descriptions of FIGS. 3 and 4, reference may be made to reference characters representing like features shown and described with respect to FIGS. 1 and 2. Furthermore, the steps and processes described with respect to FIGS. 3 and 4 below may be performed by an example autonomous vehicle (AV) 100 or AV control system 120 implementing a passenger feedback system 145, as described herein with respect to FIG. 1. Referring to FIG. 3, the AV control system 120 can initiate or execute a normal mode in which the AV control system 120 operates the AV 100 nominally along a current route. In the normal mode, the feedback system 145 can output motion plan information on the feedback devices (300). As provided herein, the feedback devices can comprise a visual feedback system (e.g., lights and displays) and/or an audio feedback system (e.g., the vehicle's speakers or local speakers of display devices). The outputted motion plan information can comprise live sensor data from one or more of the sensors 102 of the AV 100 (e.g., a live LIDAR point cloud map), map content indicating the current route being followed by the AV 100, and/or more granular information concerning the AV's perception, object classification (e.g., color-coded bounding boxes around classified objects such as pedestrians and other vehicles), and trajectory decisions.

In the normal mode, the feedback system 145 can also detect a remote assistance trigger from the AV control system 120 (305). The remote assistance trigger can indicate that the AV control system 120 is entering a teleassistance state. In response to the remote assistance trigger, the feedback system 145 can initiate a transitional mode to alert that passenger(s) of the AV 100 that a remote assistance event is occurring (310). For example, the transitional mode can correspond to a phase in which the AV control system 120 is connecting or attempting to connect with a remote assistance system 190. As another example, the transitional mode can correlate with the AV 100 slowing down or pulling over. In the transitional mode, the feedback system 145 can output visual cues, such as interior lighting changes and/or an alert display on the display devices (312). The feedback system 145 can further output audio transitional cues, such as fading out a current audio output and providing human or computerized speech describing the transition. The feedback system 145 may then initiate an interaction feedback mode to enable two-way interaction between the passenger(s) of the AV 100 and a remote operator (315).

FIG. 4 is a flow chart describing another method of providing interactive feedback to passengers of an AV. The processes described with respect to FIG. 4 may be performed in conjunction with the processes described with respect to FIG. 3 or can comprise a standalone method implemented by the feedback system 145. Referring to FIG. 4, the feedback system 145 can detect a remote assistance trigger (400). As described herein, the remote assistance trigger can be initiated by the passenger (402) or by the AV control system 120 (404). Based on the remote assistance trigger, the feedback system 145 can initiate communications between the passenger(s) of the AV 100 and a remote operator 199 (405). In certain examples, the feedback system 145 can establish a local network connection (e.g., BLUETOOTH) with the mobile computing device 198 of the passenger, or the backend remote assistance system 190 can establish a communication connection with the mobile computing device 198 of the passenger directly via a designated service application executing on the passengers computing device 198 (407). In variations, the feedback system 145 can establish the communication connection via the feedback devices of the AV 100, such as the on-board display and audio systems 146, 147 of the interaction feedback system 145 (409).

In various implementations, the feedback system 145 can generate remote assistance updates using the feedback devices (410). For example, the communications between the AV control system 120 can the remote assistance system 190 (or human operator 199) can cause the feedback system 145 to generate update outputs on the on-board display device(s) 146 and/or provide audio output (e.g., comprising human or computerized speech) describing the progress in resolving the teleassistance state of the AV 100. In some aspects, the feedback system 145 can output locally stored messages and/or content as a fallback option, for example, when the resolution process is protracted or when connectivity issues occur.

In various implementations, the feedback system 145 can determine whether the teleassist state is resolved (415). For example, the AV control system 120 can transmit a resolve message to the feedback system 145 when a resolution response is selected by an operator 199 and received by the control system 120. If the teleassistance state is resolved (417), then the feedback system 145 can terminate the interaction feedback mode and revert back to outputting motion plan data via the feedback devices, as described herein (420). For example, the feedback system 145 can display live sensor data from the AV's sensor systems 102 and/or route data, ETA data to the destination, map content, and the like.

If the teleassistance state is not resolved (419), then the feedback system 145 can determine whether a set of recovery thresholds have been exceeded (425). Recovery constraints can comprise timing constraints. For example, if the teleassistance state lasts for more than two minutes, the recovery thresholds may be exceeded. The recovery constraints can further comprise resolution likelihood constraints (e.g., a probability that the teleassistance state will be resolved). Accordingly, if the likelihood of resolution does not exceed 90%, then the recovery thresholds may be exceeded. Furthermore, a combination of timing and likelihood constraints may be determined by the AV control system 120 or the feedback system 145 based on the nature of the teleassistance state. As an example, if the probability that teleassistance state will be resolved in the next two minutes does not exceed 90%, then the recovery thresholds may be exceeded.

If the recovery thresholds are not exceeded (427), then the feedback system 145 can continue outputting updates and determining whether the teleassist state is resolved (415). However, if the recovery thresholds are exceeded (429), then the remote assistance system 190 can coordinate a recovery of the AV 100 and an additional pickup of the passengers at the AV's current location. In addition, the feedback system 145 can generate a recovery feedback indicating that another vehicle is en route to rendezvous with the passengers to complete the remainder of their trip (430). In certain implementations, the recovery feedback can comprise content indicating vehicle information of the new selected vehicle and/or driver information of the new driver that is to rendezvous with the passenger(s) (434). In certain aspects, the feedback system 145 can display progress information indicating an ETA and motion data of the backup vehicle on map content. Additionally, the feedback system 145 can generate content indicating on-site recovery by a servicing vehicle or technician (432). Once the passengers have been attended to, the passenger feedback system 145 can power down.

Hardware Diagrams

Figure 5:
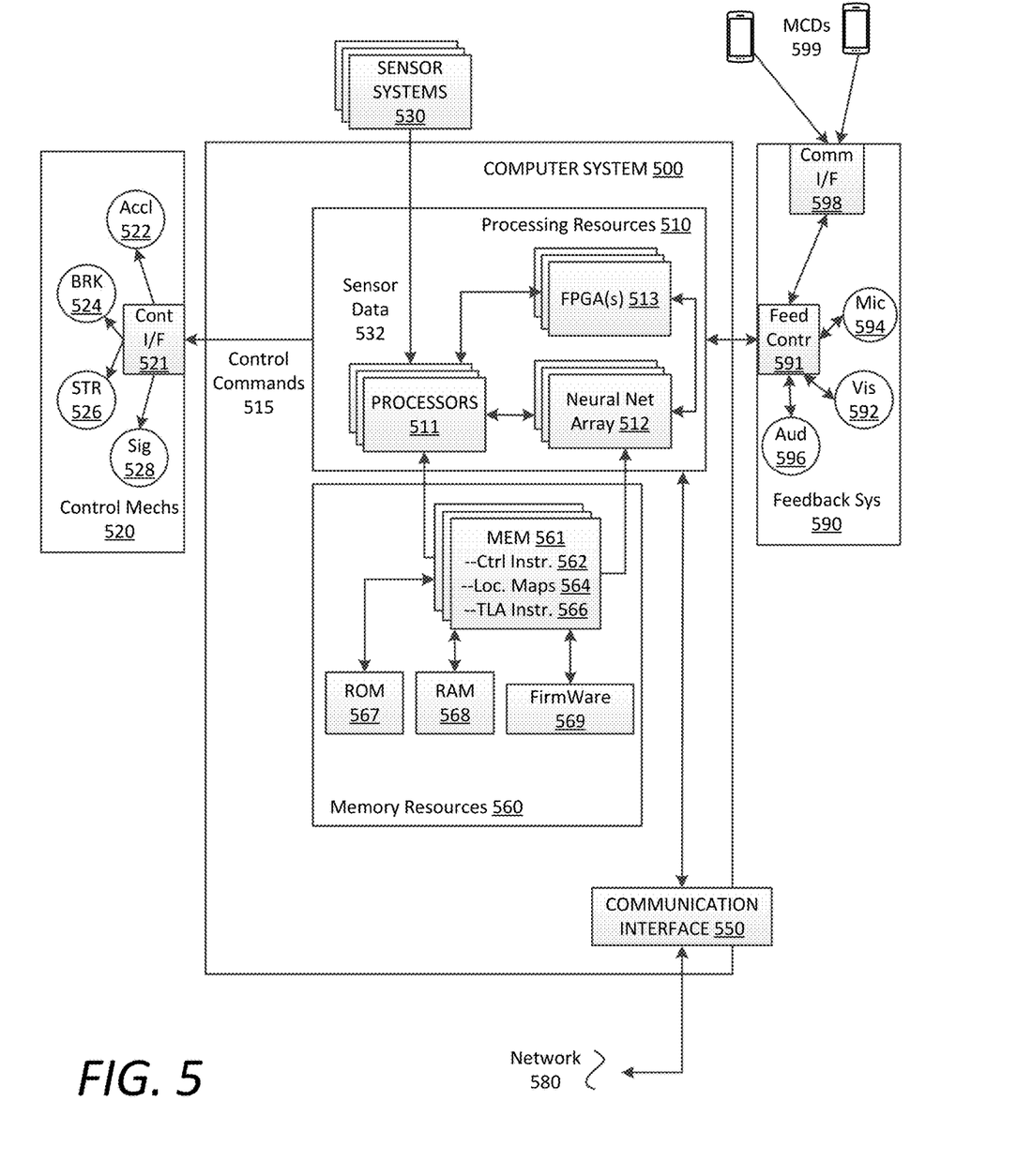
FIG. 5 is a block diagram illustrating a computer system for an autonomous vehicle upon which examples described herein may be implemented.

FIG. 5 is a block diagram illustrating a computer system upon which example AV processing systems described herein may be implemented. The computer system 500 can be implemented using a number of processing resources 510, which can comprise processors 511, field programmable gate arrays (FPGAs) 513. In some aspects, any number of processors 511 and/or FPGAs 513 of the computer system 500 can be utilized as components of a neural network array 512 implementing one or more machine learning models and utilizing road network maps stored in memory 561 of the computer system 500. In the context of FIGS. 1 and 2, various aspects and components of the AV control system 120, 200, can be implemented using one or more components of the computer system 500 shown in FIG. 5.

According to some examples, the computer system 500 may be implemented within an autonomous vehicle (AV) with software and hardware resources such as described with examples of FIGS. 1 and 2. In an example shown, the computer system 500 can be distributed spatially into various regions of the AV, with various aspects integrated with other components of the AV itself. For example, the processing resources 510 and/or memory resources 560 can be provided in a cargo space of the AV. The various processing resources 510 of the computer system 500 can also execute control instructions 562 using microprocessors 511, FPGAs 513, a neural network array 512, or any combination of the same. In addition, the computer system 500 may be in communication with a passenger feedback system 590 of the AV, which can include a feedback controller 591 comprising a set of processing and local memory resources storing feedback instructions.

In an example of FIG. 5, the computer system 500 can include a communication interface 550 that can enable communications over a network 580. In one implementation, the communication interface 550 can also provide a data bus or other local links to electro-mechanical interfaces of the vehicle, such as wireless or wired links to and from control mechanisms 520 (e.g., via a control interface 521), sensor systems 530, and can further provide a network link to a backend transport management system or a remote assistance system (implemented on one or more datacenters) over one or more networks 580.

The memory resources 560 can include, for example, main memory 561, a read-only memory (ROM) 567, storage device, and cache resources. The main memory 561 of memory resources 560 can include random access memory (RAM) 568 or other dynamic storage device, for storing information and instructions which are executable by the processing resources 510 of the computer system 500. The processing resources 510 can execute instructions for processing information stored with the main memory 561 of the memory resources 560. The main memory 561 can also store temporary variables or other intermediate information which can be used during execution of instructions by the processing resources 510. The memory resources 560 can also include ROM 567 or other static storage device for storing static information and instructions for the processing resources 510. The memory resources 560 can also include other forms of memory devices and components, such as a magnetic disk or optical disk, for purpose of storing information and instructions for use by the processing resources 510. The computer system 500 can further be implemented using any combination of volatile and/or non-volatile memory, such as flash memory, PROM, EPROM, EEPROM (e.g., storing firmware 569), DRAM, cache resources, hard disk drives, and/or solid state drives.

The memory 561 may also store localization maps 564 in which the processing resources 510—executing the control instructions 562—continuously compare to sensor data from the various sensor systems 530 of the AV. Execution of the control instructions 562 can cause the processing resources 510 to generate control commands 515 in order to autonomously operate the AV's acceleration 522, braking 524, steering 526, and signaling systems 528 (collectively, the control mechanisms 520). Thus, in executing the control instructions 562, the processing resources 510 can receive sensor data 532 from the sensor systems 530, dynamically compare the sensor data 532 to a current localization map 564, and generate control commands 515 for operative control over the acceleration, steering, and braking of the AV. The processing resources 510 may then transmit the control commands 515 to one or more control interfaces 521 of the control mechanisms 520 to autonomously operate the AV through road traffic on roads and highways, as described throughout the present disclosure.

The memory 561 may also store teleassistance instructions 566 that the processing resources 510 can execute to identify detection or object anomalies, and transmit teleassistance requests to a backend teleassistance system over the network 580, and receive teleassistance commands in return. Execution of the instructions 562, 566 can cause the processing resources 510 to process the teleassistance commands accordingly to resolve the detected teleassistance state. Thereafter, the processing resources 510 can generate control commands 515 to cause the control mechanisms 520 to autonomously operate the AV along the current route or an alternate route accordingly.

In various aspects, execution of the teleassistance instructions 566 by the processing resources 510 can trigger the feedback controller 591 to execute an interaction feedback mode, in which visual systems 592, audio systems 595, and one or more microphones 594 are activated or otherwise reconfigured to provide remote assistance feedback to the passengers of the AV. The feedback controller 591 can comprise one or more processors, or leverage the processing resources 510 of the computer system 500 to execute the interaction feedback mode. In one example, the feedback controller 591 interfaces with the AV control system (e.g., via a control interface). Execution of feedback instructions by the feedback controller 591 can cause the feedback system 590 to initiate two-way communications between the passengers of the AV and a remote operator. In certain variations, the feedback system 590 can further include a local communication interface 598 to connect the mobile computing devices 599 of the passengers with the remote operator, as described herein.

Figure 6:
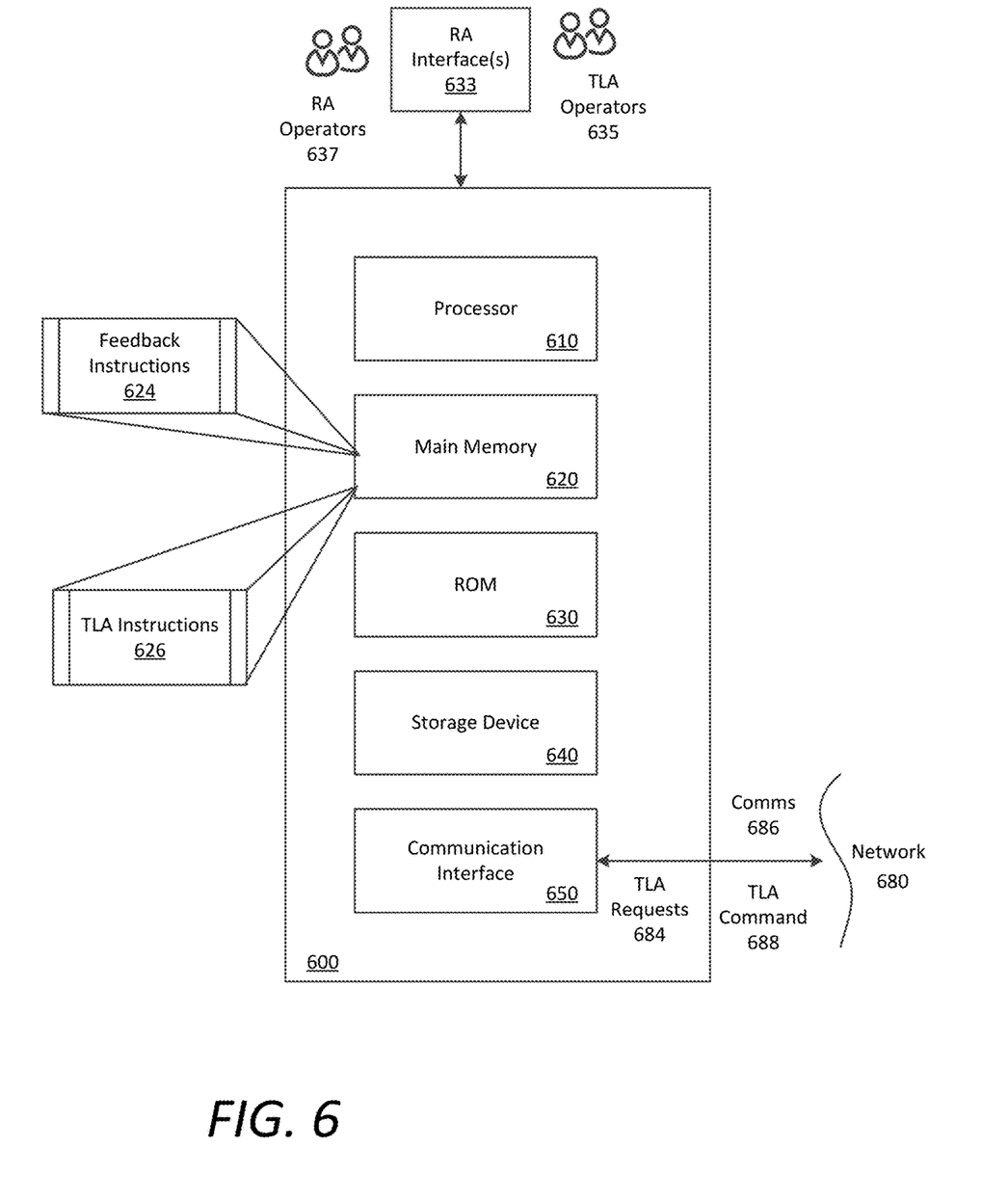
FIG. 6 is a block diagram illustrating a computer system for a backend datacenter upon which example transport systems described herein may be implemented.

FIG. 6 is a block diagram that illustrates a computer system upon which examples described herein may be implemented. A computer system 600 can be implemented on, for example, a server or combination of servers. For example, the computer system 600 may be implemented as part of a network service for providing transportation services. In the context of FIGS. 1 and 2, the remote assistance system 190 and datacenter 220 may be implemented using a computer system 600 such as described by FIG. 6.

In one implementation, the computer system 600 includes processing resources 610, a main memory 620, a read-only memory (ROM) 630, a storage device 640, and a communication interface 650. The computer system 600 includes at least one processor 610 for processing information stored in the main memory 620, such as provided by a random access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions.

The communication interface 650 enables the computer system 600 to communicate over one or more networks 680 (e.g., cellular network) through use of the network link (wireless or wired). Using the network link, the computer system 600 can communicate with one or more computing devices, one or more servers, and/or one or more autonomous vehicles. The executable instructions stored in the memory 620 can include teleassistance instructions 624, which enables the computer system 600 to receive teleassistance requests 684 from AVs operating throughout the given region. In some aspects, execution of the teleassistance instructions 624 can cause the computer system 600 to automatically generate a teleassistance command 688. In addition or as a variation, the computer system 600 can transmit the teleassistance requests 684 over one or more remote assistance interfaces 633 to human teleassistance operators 635, which can select and generate the teleassistance commands 688 to transmitted back to the AVs in order to resolve teleassistance states or scenarios.

In addition, the main memory can store feedback instructions 624 which, when executed by the processors 610, can enable communications between passengers of AVs and remote assistance operators 637 via the network 680 and remote assistance interfaces 633. In certain examples, the computer system 600 can act as an intermediary between the passengers and the remote operators 637 (e.g., enabling in-app communication with the mobile computing devices of the passengers). The computing system 600 can provide contextual teleassistance data or other AV data to the remote operators 637 such that the remote operators 637 provide the passengers real time information concerning the AV and/or the teleassistance state of the AV.

The processor 610 is configured with software and/or other logic to perform one or more processes, steps and other functions described with implementations, such as described with respect to FIGS. 1-4, and elsewhere in the present application. Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A passenger feedback system for an autonomous vehicle (AV), comprising:
one or more feedback devices to output remote assist feedback for one or more passengers of the AV; and
a feedback controller comprising one or more processing resources executing instructions that cause the feedback controller to:
detect a remote assist trigger, corresponding to a remote assist event, from a control system of the AV; and
based on detecting the remote assist trigger, transition from a normal operational mode to a feedback mode using the one or more feedback devices to enable two-way interaction between the one or more passengers and a remote operator, wherein the remote operator can transmit control commands to the AV while in feedback mode and the two-way interaction includes voice communication; and a control interface connecting the feedback controller to the control system of the AV.

2. The passenger feedback system of claim 1, wherein the executed instructions further cause the feedback controller to:
based on the remote assist trigger, establish a connection, using the communication interface, with a transport service application executing on one or more computing devices of the one or more passengers of the AV to enable the two-way interaction between the one or more passengers and the remote operator.

3. The passenger feedback system of claim 1, further comprising a communication interface enabling the two-way interaction between the one or more passengers of the AV and the remote operator, wherein the communication interface comprises an on-board display screen displaying a user interface enabling the one or more passengers to communicate with the remote operator.

4. The passenger feedback system of claim 3, wherein the communication interface further comprises a voice input device enabling the one or more passengers to provide voice input to the remote operator.

5. The passenger feedback system of claim 1, wherein the remote operator comprises a human operator.

6. The passenger feedback system claim 1, wherein the remote operator comprises a computer-based, virtual operator.

7. The passenger feedback system of claim 1, wherein the one or more feedback devices comprise a plurality of output devices including at least one audio output device and at least one visual output device.

8. The passenger feedback system of claim 1, wherein the remote assist event corresponds to at least one of a perception fault, a connectivity fault, a mechanical fault, or a motion planning fault.

9. The passenger feedback system of claim 1, wherein the executed instructions further cause the feedback controller to:
prior to initiating the feedback mode, initiate a transitional mode between the normal operational mode and the feedback mode, the transitional mode providing the one or more passengers an alert, using the one or more feedback devices, indicating that the AV has experienced the remote assist event.

10. The passenger feedback system of claim 1, wherein the remote assist event occurs at the autonomous vehicle.

11. The passenger feedback system of claim 1, wherein the feedback controller detects a remote assist trigger while in the normal operational mode of the autonomous vehicle.

12. A non-transitory computer-readable medium storing instructions that, when executed by one or more processors of an autonomous vehicle (AV), cause the one or more processors to:
detect a remote assist trigger, corresponding to a remote assist event, from a control system of the AV; and
based on detecting the remote assist trigger, transition from a normal operational mode to a feedback mode using one or more feedback devices to enable two-way interaction between one or more passengers of the AV and a remote operator, wherein the remote operator can transmit control commands to the AV while in feedback mode and the two-way interaction includes voice communication.

13. The non-transitory computer readable medium of claim 12, wherein the executed instructions further cause the one or more processors to:
based on the remote assist trigger, establish a connection with a transport service application executing on one or more computing devices of the one or more passengers of the AV to enable the two-way interaction between the one or more passengers and the remote operator.

14. The non-transitory computer readable medium of claim 12, wherein the executed instructions cause the one or more processors to enable the two-way interaction between the one or more passengers and the remote operator via a communication interface, wherein the communication interface comprises an on-board display screen displaying a user interface enabling the one or more passengers to communicate with the remote operator.

15. The non-transitory computer readable medium of claim 14, wherein the communication interface further comprises a voice input device enabling the one or more passengers to provide voice input to the remote operator.

16. The non-transitory computer readable medium of claim 12, wherein the remote operator comprises a human operator.

17. The non-transitory computer readable medium of claim 12, wherein the remote operator comprises a computer-based, virtual operator.

18. The non-transitory computer readable medium of claim 12, wherein the one or more feedback devices comprise a plurality of output devices including at least one audio output device and at least one visual output device.

19. The non-transitory computer readable medium of claim 12, wherein the remote assist event corresponds to at least one of a perception fault, a connectivity fault, a mechanical fault, or a motion planning fault.

20. A method of providing feedback to passengers of an autonomous vehicle (AV), then method being performed by one or more processors of the AV and comprising:
detecting a remote assist trigger, corresponding to a remote assist event, from a control system of the AV; and
based on detecting the remote assist trigger, transitioning from a normal operational mode to a feedback mode using one or more feedback devices to enable two-way interaction between one or more passengers of the AV and a remote operator, wherein the remote operator can transmit control commands to the AV while in feedback mode and the two-way interaction includes voice communication.

* * * * *